(12) United States Patent
Helferich

(10) Patent No.: US 10,794,516 B2
(45) Date of Patent: Oct. 6, 2020

(54) ASSEMBLY FOR CONNECTING A LINE

(71) Applicant: Deere & Company, Moline, IL (US)

(72) Inventor: Bernd Helferich, Mannheim (DE)

(73) Assignee: DEERE & COMPANY, Moline, IL (US)

(*) Notice: Subject to any disclaimer, the term of this patent is extended or adjusted under 35 U.S.C. 154(b) by 96 days.

(21) Appl. No.: 15/463,104

(22) Filed: Mar. 20, 2017

(65) Prior Publication Data

US 2017/0307115 A1 Oct. 26, 2017

(30) Foreign Application Priority Data

Apr. 22, 2016 (DE) .................. 10 2016 206 915

(51) Int. Cl.
*F16L 21/02* (2006.01)
*F16L 21/08* (2006.01)
*F02B 37/02* (2006.01)
*F16L 33/00* (2006.01)

(52) U.S. Cl.
CPC ............. *F16L 21/02* (2013.01); *F02B 37/02* (2013.01); *F16L 21/08* (2013.01); *F16L 33/00* (2013.01); *Y02T 10/144* (2013.01)

(58) Field of Classification Search
CPC .......... F16L 55/0336; F01N 1/02; F01N 1/06; F02M 35/10321; F02M 35/10; F02M 35/10032; F02M 35/10091
USPC ............................................. 285/296.1, 305
See application file for complete search history.

(56) References Cited

U.S. PATENT DOCUMENTS

| | | | | |
|---|---|---|---|---|
| RE3,459 E | * | 5/1869 | Isbell | 285/296.1 |
| 2,714,538 A | | 8/1955 | Hornbostel | |
| 3,796,445 A | * | 3/1974 | Strott | F16L 47/28 285/4 |
| 3,999,786 A | * | 12/1976 | Powondra | F16B 3/04 285/296.1 |
| 4,552,384 A | * | 11/1985 | Cyriax | F16L 47/08 285/111 |
| 5,112,086 A | * | 5/1992 | Gruber | F16L 25/0045 285/86 |
| 5,190,322 A | * | 3/1993 | Hughes | F02M 35/10144 285/236 |
| 5,406,983 A | * | 4/1995 | Chambers | E21B 17/042 138/109 |
| 5,568,944 A | * | 10/1996 | Kawasaki | F02M 35/10321 138/109 |
| 5,685,345 A | * | 11/1997 | Gieseke | B29C 65/665 138/172 |

(Continued)

FOREIGN PATENT DOCUMENTS

DE 112013000311 T5 10/2014
EP 2565393 B1 3/2013

OTHER PUBLICATIONS

German Search Report issued in counterpart application No. 102016206915.2 dated Nov. 14, 2018. (10 pages).

*Primary Examiner* — David Bochna
(74) *Attorney, Agent, or Firm* — Taft Stettinius & Hollister LLP; Stephen F. Rost

(57) ABSTRACT

An assembly for connecting a line includes a connector for detachable connection of a line, a line that can be connected to the connector, and an intermediate element for connection to the connector and the line. The intermediate element is secured on the line in such a manner that it separates the line and the connector from one another.

18 Claims, 2 Drawing Sheets

(56) References Cited

U.S. PATENT DOCUMENTS

| | | | | |
|---|---|---|---|---|
| 5,699,835 | A | * | 12/1997 | Nakagawa ....... F02M 35/10321 138/141 |
| 5,722,700 | A | * | 3/1998 | Miyake ............ F02M 35/10321 285/192 |
| 5,806,480 | A | * | 9/1998 | Maeda ............. F02M 35/10321 123/184.57 |
| 5,823,508 | A | * | 10/1998 | Nie ..................... F16L 37/0987 251/149.6 |
| 5,901,987 | A | * | 5/1999 | Godeau .................. F16L 21/03 285/148.19 |
| 6,041,824 | A | * | 3/2000 | Powell ............ F02M 35/10321 138/109 |
| 6,616,195 | B2 | * | 9/2003 | Imaeda ............... F16L 37/0985 285/305 |
| 6,733,046 | B1 | * | 5/2004 | Rief ...................... E04H 4/1654 285/276 |
| 7,328,685 | B2 | | 2/2008 | Mockenhaupt et al. |
| 7,387,188 | B2 | * | 6/2008 | Keller ................ F02M 35/1216 181/250 |
| 7,415,956 | B1 | * | 8/2008 | Prior ................. F02M 35/1216 123/184.53 |
| 7,527,302 | B2 | * | 5/2009 | Lewis ..................... B21K 1/16 285/286.1 |
| 7,837,233 | B2 | | 11/2010 | Johnston et al. |
| 7,988,204 | B2 | * | 8/2011 | Lewis ..................... F16L 47/24 285/286.1 |
| 8,172,275 | B2 | * | 5/2012 | Sumrall, Jr. ............. B21K 1/16 285/286.1 |
| 8,251,036 | B2 | * | 8/2012 | Williams ......... F02M 35/10137 123/184.21 |
| 8,375,915 | B1 | * | 2/2013 | Now ................ F02M 35/10354 123/184.21 |
| 8,434,587 | B2 | * | 5/2013 | Era ..................... F16L 55/0336 156/156 |
| 8,651,800 | B2 | * | 2/2014 | Li ..................... F02M 35/10157 415/119 |
| 9,228,542 | B2 | * | 1/2016 | Anderson ........ F02M 35/10321 |
| 9,623,594 | B2 | * | 4/2017 | French .................... F16L 21/03 |
| 9,976,031 | B2 | * | 5/2018 | Jang ..................... F02M 35/161 |
| 2003/0075923 | A1 | * | 4/2003 | Lepoutre .......... F02M 35/10321 285/330 |
| 2007/0284828 | A1 | | 12/2007 | Komukai et al. |
| 2009/0184514 | A1 | * | 7/2009 | Williams ......... F02M 35/10321 285/226 |
| 2012/0186552 | A1 | * | 7/2012 | Niakan ............ F02M 35/10354 123/184.21 |
| 2013/0216406 | A1 | | 8/2013 | Berruet et al. |
| 2014/0261279 | A1 | * | 9/2014 | Horii ................ F02M 35/10321 123/184.61 |
| 2017/0058845 | A1 | * | 3/2017 | Stemm ............. F02M 35/10321 |
| 2018/0112634 | A1 | * | 4/2018 | Hoffman .......... F02M 35/10321 |
| 2018/0230950 | A1 | * | 8/2018 | Klockow ............ F16L 27/0861 |
| 2018/0347522 | A1 | * | 12/2018 | Ooki ................ F02M 35/10321 |

* cited by examiner

ASSEMBLY FOR CONNECTING A LINE

RELATED APPLICATIONS

This application claims the benefit of German Application Ser. No. 102016206915.2, filed on Apr. 22, 2016, the disclosure of which is hereby expressly incorporated by reference in its entirety.

FIELD OF THE DISCLOSURE

The present disclosure relates to connecting a line, and in particular to an assembly for connecting a line.

BACKGROUND

Lines are used in many conventional applications for conducting gaseous, liquid and solid materials or the like. The lines are commonly used to connect machine components that are subject to different operating temperatures. The lines are under heavy stress due to the different operating temperatures. Areas of the lines have different coefficients of thermal expansion. The temperature resistance of the lines also decreases with increasing operating temperature. The service life of the lines is thus limited by the areas with the lowest long-term temperature resistance.

Precisely in applications in which such lines are used at operating temperatures of more than 150° C., a portion of or the end of the line is subjected to these high temperatures. The operating temperatures of the machine components can have an effect on the connected line areas due to thermal conduction, particularly on engines and the line connections there.

The lines are usually flexible in order to allow adaptability to the installation space and to compensate for pressure stresses or operationally induced relative movements. Plastic material is therefore typically used for such lines. If cost-effective plastics are used, embrittlement or decomposition of the plastic material takes place due to the material stress at the high operating temperatures. Lines therefore become leaky and permeable and the function fails.

In this event, the materials that are supplied by the line can enter the wider surroundings outside the line. This results in a decrease or cessation of delivery at the end of the line. Contamination of the surroundings by the escaping materials from the line or contamination of the supplied materials by intrusion of media from the surroundings into the line are other consequences.

Such damage is rectified by replacing the lines. This ties up resources and, in the event of damage, endangers the additional connected machine components, parts or the like. To avoid this, plastics that remain functional even at high operating temperatures are used as material for the lines. These plastics are more expensive, however, and thus lead to higher costs for producing the line.

Thus, a need exists for providing a line that has a long service life and is cost-effective.

SUMMARY

In one embodiment of the present disclosure, an assembly is provided for connecting a line, including a connector for detachable connection of a line, a line that can be connected to the connector and an intermediate element for connection to the connector and the line, wherein the intermediate element is secured on the line in such a manner that it separates the line and the connector from one another.

The direct contact of the intermediate element with the conductor and the intercalation of the intermediate element ensure a thermal insulation of the line from the connector. The line can thus be made from a cost-effective material that does not have to meet the temperature requirements that are dictated by the temperature stress at the connector. The temperature stress that is caused by the connector is absorbed only by the intermediate element. As a result, damage to the line of the type that would arise from excessive long-term temperature stress is prevented. This allows a long service life for the line by effectively preventing decomposition of the line material due to high temperature stress. The intermediate element also allows a tolerance compensation between the dimensions of the line and the dimensions of the connector. The intermediate element enables a sealing connection between the line and the connector and thus also fulfills a sealing function.

In one embodiment, the intermediate element can be non-detachably connected to the line. The non-detachable fastening of the intermediate element to the line increases security against loss. Functionality can also be preserved against operationally induced vibrations or movements. This can be accomplished with a hose clamp or a clamping connection.

In one design, the intermediate element can penetrate the line or the connector in a radial or axial direction. In the penetration, the intermediate element passes through openings in the line and thus extends to the opposing outer surface. This guarantees a high degree of protection against loss. This possibility also allows fastening the intermediate element detachably as well as non-detachably to the line. In a detachable variant, the intermediate element can be pushed through the line and held by means of additional wall sections on the other side of the line. In this way, both axial and radial forces can be effectively supported and a long service life and functionality are guaranteed.

In a further embodiment, the intermediate element can be fixed in place on the line by a form fit or a force fit. A possible form fit can be provided by a broadening of the intermediate element on or in the line. It is likewise possible to position the intermediate element in a U shape around the free end of the line. This makes it possible to support radial or axial forces effectively in at least one direction. The form fit also constitutes a cost-effective possibility for securing the intermediate element on the line. In this way, the intermediate element can also be securely fixed to the line under vibrations in operation.

In one design, the intermediate element can also be produced on the line by an overmolding process. Due to the overmolding, the shape of the intermediate element can be very well adapted to the line. It is possible in this case to provide the intermediate element both detachably and non-detachably on the line. The non-detachable connection yields a high level of protection against loss. The overmolding also allows even small installation spaces to be effectively used for the assembly.

In one embodiment, the intermediate element can be connected to the connector inside the line or outside the line. The line can be pushed onto the connection and also inserted into the connector. The assembly can thereby be adapted to various load cases.

In another embodiment, the intermediate element can have a rubber-like material, resist temperatures greater than 150° C. and have a Shore hardness of 60 to 100 Shore A. The rubber-like material guarantees a high flexibility of the intermediate element. The intermediate element can capture and compensate for vibrations, pressure pulsations or movements of the line relative to the connector. Due to the high temperature resistance, the material is particularly suitable for applications in the automotive field, particularly in the field of connectors for turbochargers, but also for connecting lines to housing parts at which operating temperatures greater than 150° C. occur. This can ensure a long service life, which likewise can lower support costs. The hardness range from 60 to 100 Shore A can ensure an optimal adhesive and sealing function of the intermediate element.

A long service life can also be determined by a suitable compression set of the selected material. This prevents the material from flowing during application and thus being unable to perform its function due to deformation.

It also prevents the intermediate element from losing its shape due to excessive pressure and thus no longer having a sealing function. The long-term strength allows damping of pulsations or vibrations.

In another design, the intermediate element can be a material from the group consisting of vinyl-methyl silicones (VMQ). It may include EPDM. The material is particularly well-suited for seals. It can also withstand heat and cold, steam and UV radiation. It additionally has a high elasticity, which again provides very good sealing properties. The material also has good resistance to gasoline, oils, petroleum, aromatic and aliphatic hydrocarbons, solvents and acids.

In another embodiment, the intermediate element can include the materials silicone or AEM or FPM/FKM. Silicone has a low thermal conductivity so that there can be a very good insulation of the line from the connector. Silicone additionally has a high resistance to heat from −50 to 250° C. and can guarantee a particularly good insulation of the line from the connector at high operating temperatures. Silicone also has outstanding sealing properties relative to fluids so that the substances in the line can be advantageously sealed off from the surroundings.

AEM is resistant to additive oils, water and ozone. It also has a broad application temperature range from −30 to 175° C., so that using it provides a high temperature resistance of the intermediate element.

FPM/FKM has good resistance to oxygen, mineral oil, synthetic hydraulic fluid, fuels, aromatics, many solvents and many chemicals. FPM can cover a temperature range from −40 to 250° C. and is therefore suited for use for the intermediate element at high operating temperatures. The material can alternatively comprise FFKM. It has a temperature range of −15 to 350° C.

In another embodiment, the connector can be mounted on a turbocharger. In general, a turbocharger compresses intake gas and conducts it into the internal combustion engine. Heat results from the compression, so that the turbocharger, the housing and components attached thereto heat up severely. Moreover, the turbocharger is driven by exhaust gases from the combustion process. The exhaust gas has a high temperature, which is also transmitted to the turbocharger and components attached thereto. This also affects the connected air supply line, which usually consists of plastic. To use the assembly with a turbocharger, the line can consist of an inexpensive non-temperature resistant plastic and the intermediate element can be used as an insulator between the line and the connector on the turbocharger. Therefore, the temperature stress for the material of the line can be lowered in the critical ranges. This ensures a long service life of the line, even though it can be manufactured from an inexpensive material.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
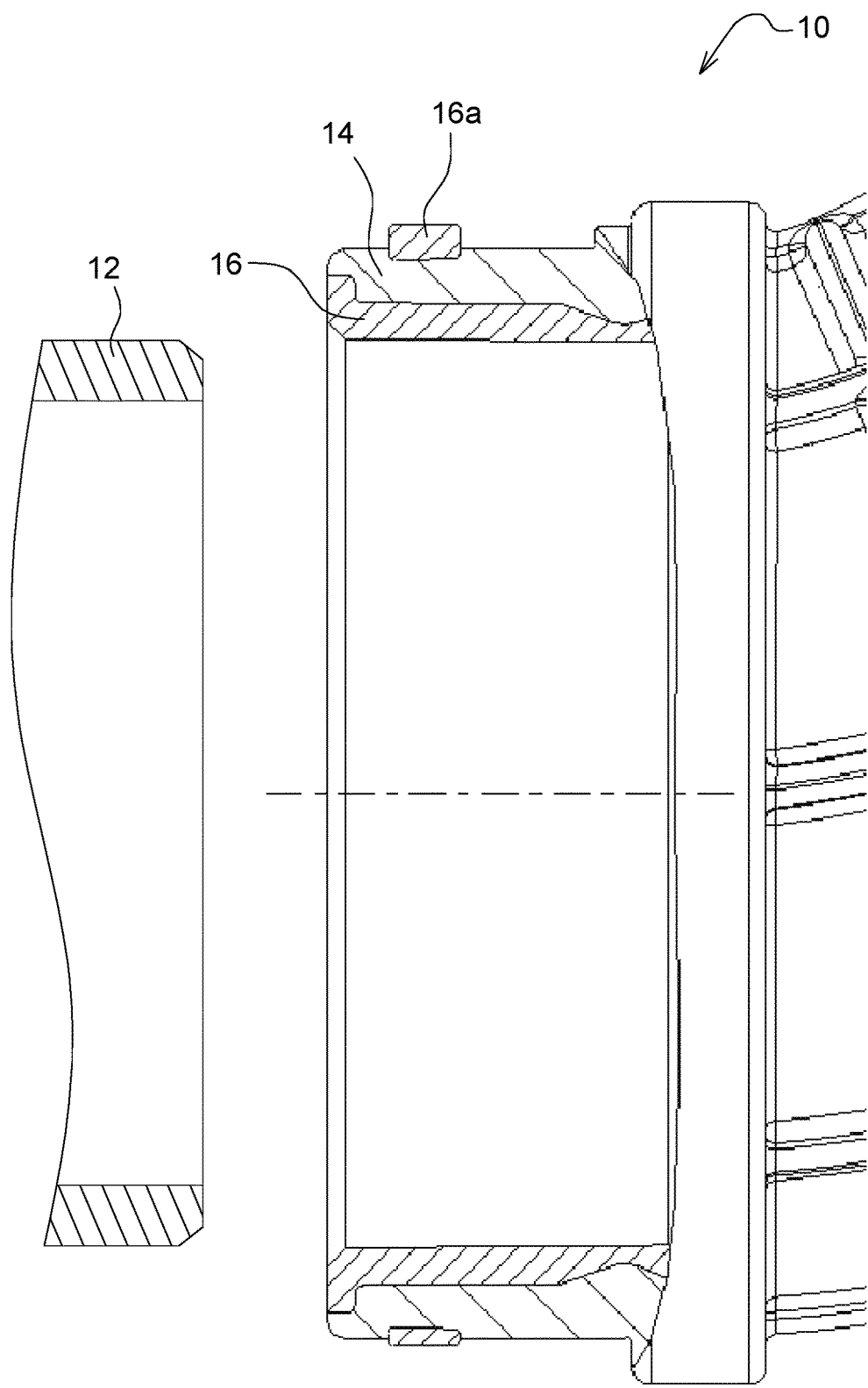
FIG. 1 is a schematic of an assembly for connecting a line.
Figure 2:
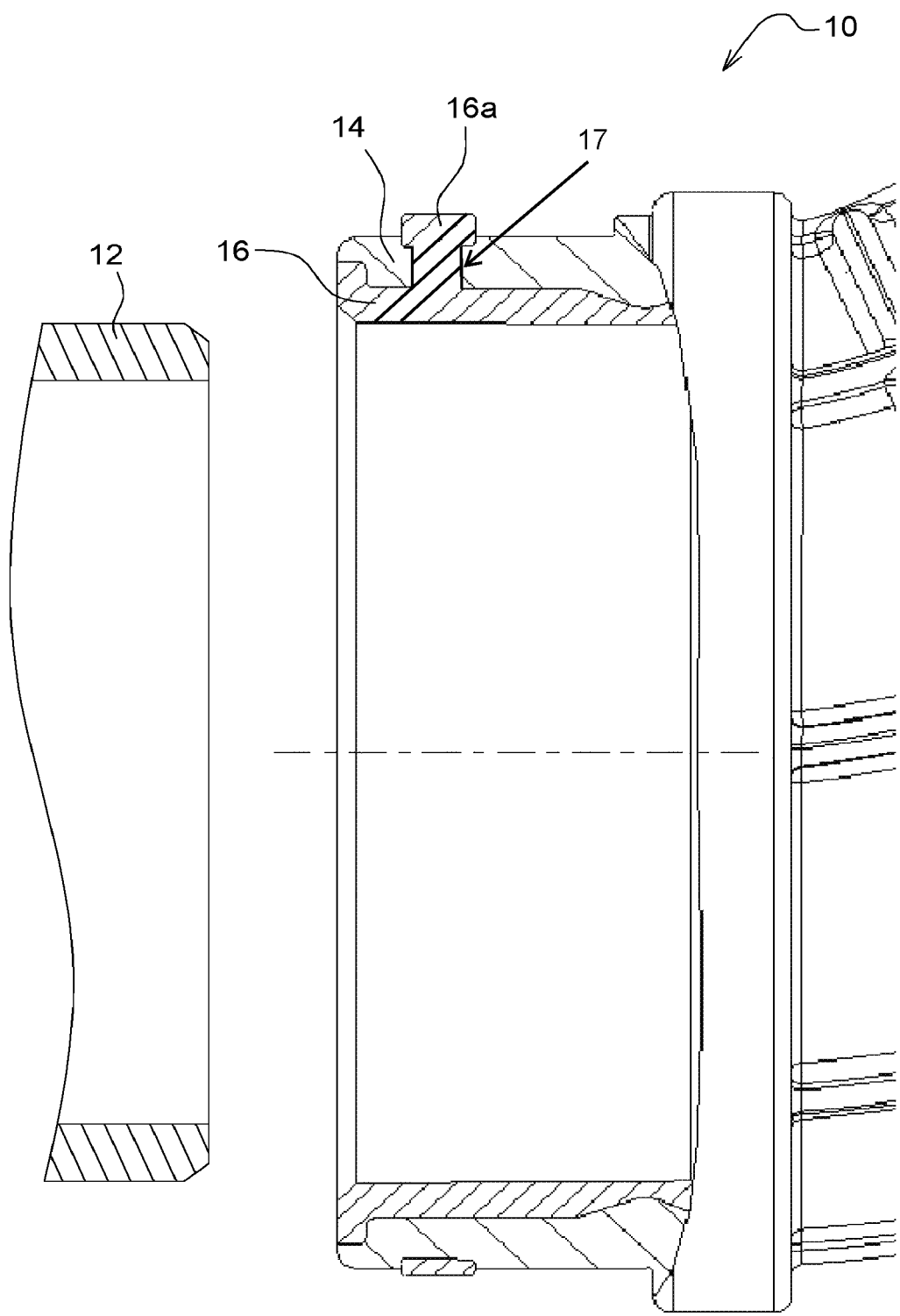
FIG. 2 is a schematic of another embodiment of an assembly for connecting a line.

In FIG. 1, an assembly 10 consists of a connector 12, a line 14 and an intermediate element 16, 16a. The connector 12 is provided on a side of a housing and can be designed in any desired manner. It is merely necessary to adapt the design of the line 14 and the intermediate element 16, 16a accordingly to the design of the connector 12 on the side of the housing. The line 14 is connected at an additional end (not shown) to an additional machine component.

The line 14 has an end region that is provided for being mounted on the connector 12. The geometry of the line 14 is adapted to the geometry of the connector 12. For this purpose, the line 14 has a region that is pushed onto or into the connector 12 and is fixed on or in the connector 12 by means of a screw connection or a retaining ring or a sleeve, for example. The line 14 is used for feeding and discharging operating media to or from the connector 12. The line 14 can consist of a plastic, the line 14 can therefore take on a flexible or rigid shape.

In FIG. 1, the intermediate element 16, 16a is formed on the periphery in the end portion of the line 14. The embodiment in FIG. 1 illustrates that the intermediate element 16, 16a extends in the axial direction over the entire end portion of the line 14 and is permanently connected to the line 14. The ridge 16a is formed such that the intermediate element 16 penetrates through the line 14 in the radial direction 17 of the line 14.

Due to this penetration, the intermediate element 16, 16a forms an anchor that allows fixation of the intermediate element 16, 16a that is secured against removal on this region of the line 14. The intermediate element 16, 16a can also enter into a non-detachable connection to the line 14 over the entire contact surface, for example, by adhesive. It is also possible, however, to mount the intermediate element 16, 16a detachably on the line 14, so that the ridge 16a can again be removed through the opening in the line 14 and thus the intermediate element 16, 16a is detachable.

In FIG. 1, the intermediate element 16, 16a is located on the inner periphery of the line 14, so that the line 14 together with the intermediate element 16, 16a is pushed onto the connector 12. The intermediate element 16, 16a is mounted on the line 14 in such a manner that the intermediate element 16, 16a prevents direct contact of the line 14 and the connector 12, wherein the intermediate element 16, 16a constitutes the only connection between the line 14 and the connector 12.

The ridge 16a on the intermediate element 16, 16a can be produced by overmolding.

In another embodiment, the intermediate element 16, 16a is provided on the outer periphery of the line 14. Thus the ridge 16a is situated on the inner periphery of the line 14.

The line 14 can be permanently fixed to the connector 12, for example, by a ring clip, screw fittings, adhesive bonds or the like.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An assembly for connecting a line, comprising:
a connector for detachable connection of a line,
a line that can be connected to the connector,
an intermediate element for connection to the connector and the line,
a groove in a radially outer surface of the line;
wherein the intermediate element is secured on the line in such a manner that it separates the line and the connector from one another when both the line and the intermediate element are positioned at least partially around the connector
further wherein, a portion of the intermediate element is defined along a radially inner portion of the line and the intermediate element has a ridge defined along the groove on the radially outer surface of the line;
further wherein, the intermediate element penetrates the line in a radial direction.

2. The assembly of claim 1, wherein the intermediate element is non-detachably connected to the line.

3. The assembly of claim 1, wherein the intermediate element is fixed on the line by a form fit or a force fit.

4. The assembly of claim 1, wherein the intermediate element is produced on the line by an overmolding process wherein a portion of the intermediate element penetrates through the line in a radial direction.

5. The assembly of claim 1, wherein the intermediate element is connected to the connector inside of or outside of the line.

6. The assembly of claim 1, wherein the intermediate element has a rubber-like material that resists temperatures greater than 150° C. and has a Shore hardness of 60 to 100 Shore A.

7. The assembly of claim 1, wherein the intermediate element comprises a material from the group of vinyl-methyl silicones.

8. The assembly of claim 1, wherein the intermediate element comprises a material silicone or AEM or FPM/FKM.

9. The assembly of claim 1, wherein the connector is mounted on a turbocharger.

10. An assembly for connecting a line, comprising:
a connector extending from a side of a housing;
a line that is a first material defining an end region configured to be mounted around the connector, the line having a plurality of openings around the end region, and
an intermediate element that is a second material positioned within the end region of the line for connection to the connector and the line,
wherein, the line does not directly contact the connector when coupled thereto,
further wherein, a portion of the intermediate element extends radially through each of the plurality of openings;
further wherein, the second material is a rubber-like material and the first material is different from the second.

11. The assembly of claim 10, wherein the first material is plastic.

12. The assembly of claim 10, further wherein the intermediate element is positioned along an inner surface of the line.

13. The assembly of claim 12, further wherein the intermediate element comprises a ridge positioned along an outer surface of the line, the intermediate element passing through the plurality of openings to couple the ridge to the portion of the intermediate element along the inner surface of the line.

14. The assembly of claim 13, further wherein the ridge and portion of the intermediate element along the inner surface of the line are formed by overmolding material of the intermediate member through the plurality of openings to fixedly couple the intermediate member to the line by forming the ridge on one side of the plurality of openings.

15. The assembly of claim 14, further wherein the ridge is formed around the circumference of the line.

16. The assembly of claim 15, further wherein the ridge is positioned within a groove defined in the line.

17. An assembly for connecting a line, comprising:
a connector for detachable connection of a line,
a line that can be connected to the connector,
an intermediate element for connection to the connector and the line,
a groove in a radially outer surface of the line;
wherein the intermediate element is secured on the line in such a manner that it separates the line and the connector from one another when both the line and the intermediate element are positioned at least partially around the connector
further wherein, a portion of the intermediate element is defined along a radially inner portion of the line and the intermediate element has a ridge defined along the groove on the radially outer surface of the line;
further wherein, the connector is mounted on a turbocharger.

18. The assembly of claim 17, wherein the intermediate element is connected to the connector inside of or outside of the line.

* * * * *